United States Patent
Arnason

(10) Patent No.: US 12,295,373 B2
(45) Date of Patent: May 13, 2025

(54) METHOD AND DEVICE FOR DELAYING RIGOR MORTIS IN FISH

(71) Applicant: SKAGINN HF., Akranes (IS)

(72) Inventor: Ingolfur Arnason, Akranes (IS)

(73) Assignee: LAMBHUSASUND EHF., Akranes (IS)

( * ) Notice: Subject to any disclaimer, the term of this patent is extended or adjusted under 35 U.S.C. 154(b) by 1339 days.

(21) Appl. No.: 15/568,250

(22) PCT Filed: Apr. 22, 2016

(86) PCT No.: PCT/IS2016/050007
§ 371 (c)(1),
(2) Date: Oct. 20, 2017

(87) PCT Pub. No.: WO2016/170550
PCT Pub. Date: Oct. 27, 2016

(65) Prior Publication Data
US 2019/0116812 A1     Apr. 25, 2019

(30) Foreign Application Priority Data

Apr. 21, 2015  (IS) ......................................... 050104

(51) Int. Cl.
| | |
|---|---|
| *A22B 5/00* | (2006.01) |
| *A22C 25/00* | (2006.01) |
| *A22C 25/08* | (2006.01) |
| *A22C 25/14* | (2006.01) |
| *A23B 4/02* | (2006.01) |

(Continued)

(52) U.S. Cl.
CPC ............ *A22B 5/0076* (2013.01); *A22C 25/00* (2013.01); *A22C 25/08* (2013.01); *A22C 25/145* (2013.01); *A23B 4/02* (2013.01); *A23B 4/023* (2013.01); *A23B 4/06* (2013.01); *A23B 4/08* (2013.01);

(Continued)

(58) Field of Classification Search
CPC ........... A22B 5/00; A22C 25/08; A22C 25/14; A23B 4/06
See application file for complete search history.

(56) References Cited

U.S. PATENT DOCUMENTS

| | | | |
|---|---|---|---|
| 1,420,740 A * | 6/1922 | Petersen | ............... F25D 13/065 |
| | | | 62/64 |
| 2,616,811 A | 6/1947 | Kjorstad | |

(Continued)

FOREIGN PATENT DOCUMENTS

| | | | | |
|---|---|---|---|---|
| EP | 2245941 | A1 * | 11/2010 | ............. A23L 3/375 |
| GB | 191224244 | A * | 9/1913 | ............... A23B 4/08 |

(Continued)

OTHER PUBLICATIONS

USGS—Why is the ocean salty? Mar. 9, 2014 <web.archive.org/web/20140309061014/http://water.usgs.gov/edu/whyoceansalty.html> (Year: 2014).*

(Continued)

*Primary Examiner* — Viren A Thakur
(74) *Attorney, Agent, or Firm* — Tarolli, Sundheim, Covell & Tummino LLP

(57) ABSTRACT

A method and an apparatus for bringing fish to an undercooled state by a sub-chilling process before processing, which prolongs rigor and allows processing of the fish in rigor providing better quality fish products.

14 Claims, 4 Drawing Sheets

(51) Int. Cl.
*A23B 4/023* (2006.01)
*A23B 4/06* (2006.01)
*A23B 4/08* (2006.01)
*A23B 4/09* (2006.01)
*A23B 4/26* (2006.01)

(52) U.S. Cl.
CPC .................. *A23B 4/09* (2013.01); *A23B 4/26* (2013.01); *A23V 2002/00* (2013.01)

(56) References Cited

U.S. PATENT DOCUMENTS

| | | | |
|---|---|---|---|
| 4,700,547 A | | 10/1987 | Hayashi |
| 4,978,546 A | * | 12/1990 | Haram .................. A23B 4/023 426/327 |
| 6,825,446 B1 | | 11/2004 | Arnarson et al. |

FOREIGN PATENT DOCUMENTS

| | | | | | |
|---|---|---|---|---|---|
| GB | 2464347 A | * | 4/2010 | ............. | A22C 25/00 |
| WO | WO2010/125589 A1 | | 11/2010 | | |
| WO | WO2014/174535 A1 | | 10/2014 | | |

OTHER PUBLICATIONS

"Why don't the oceans freeze?" Published Apr. 29, 2013 <https://www.wtamu.edu/~cbaird/sq/2013/04/29/why-dont-the-oceans-freeze/> (Year: 2013).*

"Engineering Toolbox" Feb. 9, 2014 <http://web.archive.org/web/20140209225747/http://www.engineeringtoolbox.com:80/sodium-chloride-water-d_1187.html> (Year: 2014).*

UCSB ScienceLine—Feb. 8, 2015 <https://web.archive.org/web/20150208141301/http://scienceline.ucsb.edu/getkey.php?key=621> (Year: 2015).*

Britannica. Oct. 11, 2014 <https://web.archive.org/web/20141011102138/http://www.britannica.com/EBchecked/topic/519712/salt-NaCl/53231/Occurrence> (Year: 2014).*

Mayer, Jean & Goldberg, Jeanne. "Nutrition" The Washington Post. Jul. 29, 1987 (Year: 1987).*

Attaran, R.R. & Probst, F. "Histamine fish poisoning: a common but frequently misdiagnosed condition." Emerg Med J 2002;19:474-475 <https://www.ncbi.nlm.nih.gov/pmc/articles/PMC1725946/pdf/v019p00474.pdf> (Year: 2002).*

Losada et al., "Effect of previous slurry ice treatment on the quality of cooked sardine (*Sardina pilchardus*)," Eur Food Res Technol (2006) 224: pp. 193-198.

* cited by examiner

METHOD AND DEVICE FOR DELAYING RIGOR MORTIS IN FISH

BACKGROUND OF THE INVENTION

Field of the Invention

The invention provides a method and a device for cooling fish directly after slaughter and to delay the rigor phase of the fish. Furthermore, the present invention provides a new method to keep fish in rigor for a prolonged period and to process the fish in rigor.

Brief Discussion of the Related Art

A continuous development of food processing, such as fish products is always on demand and a big effort has been put into increasing utilization and value of the product as well as meeting demands for quality after processing.

The time period from when a caught fish ends up on the deck of a fishing ship and to the time the fish has been processed and is ready for packing can vary depending on where the processing is performed. In many cases the processing is done on land, which requires storing the fish at sea and during transport to the factory. All handling and transport has effect on the quality of the fish, especially on soft and fragile fish. Currently, slaughtered salmon is chilled or frozen on ice in Styrofoam boxes on ice. The ice does damage to the surface of the fish and the ice needs to be melted and dealt with in an environmentally friendly manner and the boxes need to be washed and transported back or destroyed. This is both costly and time consuming.

U.S. Pat. No. 6,825,446 discloses a technology which can be used for cooling the products, such as fish fillets, to the under-cooled state by using the Combined Blast and Contact (CBC) cooling method. This gives the necessary precise control of the cooling and an effective cooling for bringing the fillets to the under-cooled state. The fish fillet is cooled down with CBC technology. This technology involves cooling the fish fillet to the phase transition of freezing and process the fillet in an under-cooled state. When the fillet is in a under-cooled state it becomes stiffer than during conventional processing and the stiffness enables processing without the fillets loosing quality because of gaping in the flesh and further allows for removing the pin bones with more efficiency and accuracy than prior art methods. This technology results in a shell or crust on the surface of the fish and the temperature of the surface of the fish and the interior of the fish will not be the same.

WO 2014/174535 discloses a method for processing undercooled fish, chilled by super-chilling using a saline solution and slurry ice to bring the fish to an undercooled state and processing the fish after being brought to an undercooled state. This technology has the drawback that the temperature of the slurry is at the freezing point of the slurry solution determined by the salt concentration and the temperature of the surface and the inside of the fish will not be the same. Furthermore, the temperature of the slurry solution being at its freezing point will result in the surface of the fish to freeze and/or create form an ice shell.

One of the problems of handling and processing fresh fish is bacterial contaminations such as *Listeria* contamination. One of the processes to reduce or eliminate bacterial contamination in fish is freezing, but freezing is not always desirable and especially when providing fresh unfrozen fish to fish markets.

EP 2 328 420 discloses an apparatus for thawing or cooling food products comprising a tank filled with heating or cooling medium and a spiral shaped blade or screw conveyor extending between opposite ends of the tank. The blade rotates and provides a rotational movement of the screw conveyor thereby conveying the food products between opposite ends of the tank. A temperature controlling system regulates the temperature of the heating or cooling medium. The tank is designed to have a plurality of heat or cooling supplying units along the tank to provide a substantial uniform temperature distribution into the liquid during the thawing or cooling of the food products.

SUMMARY OF THE INVENTION

It is an object of the present invention to overcome or ameliorate the aforementioned drawbacks of the prior art and to provide an improved and/or alternative and/or additional method or device for delaying rigor mortis in freshly slaughtered fish and prolonging the period the fish is in rigor phase. It is one preferred object of the present invention to provide a device in order to delay rigor mortis in slaughtered fish. Moreover, it is a preferred object of the present invention to provide a method and device, preferably designed as a cooling tank for receiving whole fish after slaughtering and optionally also after gutting and/or bleeding and to use salt- and temperature-controlled solutions to under-cool the fish to delay the onset of rigor mortis and/or prolong the rigor phase. By delaying the rigor phase and prolonging the time the fish is passing through the rigor phase leaves the fish in better condition to be processed by current methods and machinery for processing fish.

Another preferred object of the present invention is to provide a device having a design where a fish is transported after slaughtering and optionally also gutting and/or bleeding to a cooling device further comprising a mechanism to provide substantially continuous movement of the content in the cooling device. Also, it is one preferred object of the present invention to provide a device which can be implemented adjacent to a fish farm, such as a salmon fish and slaughtering farm or on a fishing vessel.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by a method for delaying rigor mortis in slaughtered fish, the method comprises receiving slaughtered, fish and bringing the fish to an under-cooled state in a stepwise process of placing the fish in first salt-controlled and temperature controlled solution in at least one first container, where: i) the salt concentration of the solution is set and a temperature of the solution maintained such that the temperature is higher than the freezing point of the solution, ii) providing substantially continuous movement of the fish in the solution during the step of bringing the fish to an under-cooled state, and iii) maintaining the volume of the solution in the at least one container to at least 50% of the total volume of fish and solution. Thereafter the fish is transferred to a second container where the temperature in the further container is maintained below 0° C.

The present invention provides a new method and apparatus for delaying the onset of rigor mortis in slaughtered fish and to prolong the time the fish is in rigor phase. The method and the device of the present invention provide a way to delay the rigor process by starting a cooling process resulting in under-cooling of whole fish directly after it has been caught or brought out of a sea cage or an aquaculture cage and slaughtered, where the fish is brought to an under-cooled state in a salt-controlled and temperature-controlled solution, where a salt concentration is chosen that determines a freezing point of the solution and the temperature of the solution is maintained or manually set substantially constant at a temperature which is higher that the freezing point of the solution. The new method provides conditions where the temperature at the surface of the fish and the inside of the fish (flesh) is substantially the same. When undercooling fish using prior art methods, a shell or crust of ice forms at the surface of the fish generating an insulating layer that slows cooling inside the fish and maintains for an extended period a higher temperature inside the fish than on the surface. By using the present method and device, the salt concentration and temperature of the solution provides conditions at the surface of the fish preventing any shell or crust formation at the surface allowing more effective heat transfer and thus more effective cooling of the flesh of the fish to bring the whole fish to a desired temperature. In order to further prevent shell or crust formation at the surface of the fish during the cooling process, a movement of the fish is maintained in the solution during the under-cooling process. Furthermore, the ratio of solution and fish in the tank is kept such that the salt-controlled and temperature-controlled solution constitutes at least 50% of the filled volume (fish and solution) in in the container. The new and improved method and device further provides a solution of storing and transferring freshly caught and slaughtered fish to a processing site as an un-frozen product in an ice-free environment.

It is the combination of a) using a salt-controlled and temperature-controlled solution at a set temperature and a salt concentration to set the freezing point of the solution below the set temperature of the solution, such that the salt melts any formation of a shell or crust at the surface of the fish, and thereby bringing the fish to a desired temperature at or near the phase transition of freezing the fish without freezing the fish, b) moving the fish around in the solution during the undercooling process to prevent the fish from freezing or hardening, c) keeping the volume of fluid above 50% with respect to total volume of fish and fluid and d) storing the fish at the desired temperature at or near the phase transition of freezing the fish without freezing the fish which provides the solution of providing a new and improved method and apparatus of cooling and storing freshly slaughtered fish before it is processed resulting in better quality of processed fish product when the processing takes place hours or days after the fish is caught.

For best quality of end product, the fish is bleed, gutted and washed before it is processed further. There are a number of benefits by treating whole fish this way after slaughtering, such as extended shelf life, reduced packing costs, drip loss is reduced and cost relating to ice is eliminated. Furthermore, this method makes rigor processing at shore possible for the first time and superior yield is possible after processes such as heading, filleting and bone removal. At last the quality of the product is increased by eliminating ice burns, bruises on muscle when ice is used for cooling and transport and bacterial count is dramatically reduced. In order to obtain these qualities in a product, the fish is brought down to an undercooled state in a slow process by placing the fish in salt-controlled and temperature controlled solutions, where the salt concentration and set temperatures of the salt-controlled and temperature controlled solution(s) regulate the temperature of the fish during the cooling process. A "substantially continuous" movement of the fish during the cooling process prevents the fish from stiffening and freezing. The process of bringing the fish down to an undercooled state by sub-chilling can be about 1 hour and thereafter this fish is placed into containers at a temperature around −1° C. By following this process the fish may take up to 5 days to go through the rigor phase and can be processed in rigor or after. The processing steps, after undergoing the cooling process of the present invention, also result in a more valuable product with less gaping and longer shelf life as discussed above.

The method and the apparatus of the present invention provides new means of delaying the fish for entering rigor mortis and also keeping the fish in the rigor phase for a longer time per time unit. This is obtained by placing the fish in a cooling tank for a certain amount of time in a salt-controlled and temperature controlled solution having a salt concentration where the salt concentration and set temperatures of the salt-controlled and temperature controlled solution is such that the temperature of the solution is maintained at a temperature within the range between +1.0 and −3.0° C. and preferably within the range between −1.0 and −3.0° C. The salt in the solution prevents the surface of the fish to freeze and harden, whereas the temperature of the solution keeps the fish below freezing point. This is accomplished by adjusting the salt concentration of the solution so that the temperature of the solution is "sub-zero" and such that the salt concentration is high enough to melt any ice or shell formation around the fish as it keeps the freezing point of the solution higher than the set temperature of the solution. The fish may then in some preferred embodiments be transferred to a second salt-controlled and temperature controlled solution for a second step of bringing the fish to an undercooled state. Here the salt concentration is increased and the solution is brought to a temperature within a range from −1 to −12° C., such as a temperature within the range from a range from −2 to −5° C. The time of these two steps is adjusted to a value in the range between 0.5 to 3 hours, depending on the speed of slaughtering and batches collected each time, but the time of bringing a batch of fish to an under-cooled state depends on the size of the fish in the batch and the fat content of the fish. The novel method of the present invention also teaches a substantially continuous movement of the salt-controlled and temperature controlled solutions and the whole fish in the tank, but this provides faster cooling and better quality of whole fish before processing. The fish can then be placed in containers and stored for several days (4-5) at −1° C. or below and then be brought to land and processed in rigor phase.

The invention further provides an apparatus for prolonging the rigor process in slaughtered fish, where the apparatus comprises a) means for transporting the slaughtered fish to a cooling device, b) a cooling device for bringing the slaughtered fish to an under-cooled state, and c) one or more containers to receive and store the slaughtered fish in a "under-cooled" state in rigor at a temperature below 0° C. until the fish is processed. The cooling device comprises i) at least one container connected to a heat exchanger and a temperature feedback control unit, to set the temperature of a salt-controlled and temperature controlled solution in the container, and ii) stirring means for providing substantially continuous movement of the fish in the solution.

The advantage of the apparatus and the method of the present invention is the result of the processing, but fish products processed after the sub-chilling according the present invention are of much better quality and the under-cooling also reduces or eliminates bacterial contamination such as *Listeria* content in fish. Furthermore, by processing the fish cooled by the method of the present invention makes processing such as filleting, skinning and pin-bone removal much more effective and results in better yield.

In one embodiment the apparatus for delaying the onset of rigor mortis or prolonging the rigor process in slaughtered fish comprises means for transporting the slaughtered fish to a cooling device and a cooling device for bringing the slaughtered fish to an "under-cooled" state in at least two steps of:
  i) placing the fish in first salt-controlled and temperature controlled solution having a salt concentration in the range of 0.1-10% and a temperature within the range of +1 to −3° C., and preferably in the range from −0.5 to −3° C. where the salt concentration and set temperatures of the salt-controlled and temperature controlled solution brings the homogenous temperature of the fish to a temperature in the range from +2 to −1° C., and more preferably to a temperature in the range from 0 to −1° C.
  ii) transferring the fish to a second salt-controlled and temperature controlled solution having a salt concentration of 1-20% and a temperature within the range from −1 to −12° C., where the salt concentration and set temperatures of the salt-controlled and temperature controlled solution brings the homogenous temperature of the fish to a value in the range from −0.1 to −3° C., and preferably within the range −0.5 to −3° C., such as about −1° C., or about −1.5° C.

In the above mentioned first under-cooling step (i) the salt content of the solution is preferably in the range 1-5%, such as in a range from about 1% or from about 1.5% or from about 2%, to about 5%, or to about 4% or to about 3.5%, such as a salt content of about 1.5%, or about 2% or about 2.5% or about 3%. The solution is maintained at a temperature within a range from about +1° C. but preferably from about 0° C., and more preferably from about −0.5° C., such as from about −1° C. such as from about −1.5° C., to about −3° C., such as to about −2.5° C. such as to about −2° C. In some embodiments the fish is cooled in this first under-cooling step for a period of time within the range from about 10 minutes, but more preferably from about 15 minutes such as from about 20 minutes or from about 25 minutes or from about 30 minutes, to about 75 minutes, or to about 65 minutes or to about 60 minutes or to about 55 minutes or to about 50 minutes or to about 45 minutes, such as for about 30 minutes or for about 40 minutes or for about 45 minutes or for about 50 minutes or for about 60 minutes.

In the second cooling step the salt concentration is preferably within a range from about 1%, such as from about 2% such as from about 3% such as from about 4% or from about 5%, to about 20%, or to about 15% or to about 12% such as to about 10% such as to about 8% or to about 7%, such as a salt content of about 5%, or about 6% or about 7% or about 8%. The solution is preferably maintained at a temperature within a range from about −1° C. but preferably from about −1.5° C., and more preferably from about −2° C., such as from about −2.5° C. such as from about −3° C., to about −12° C., such as to about −10° C. such as to about −8° C., such as to about −7° C. such as to about −6° C., such as a temperature of about −2° C., or about −3° C., or about −4° C. In some embodiments the fish is cooled in the second under-cooling step for a period of time within the range from about 6 minutes, but more preferably from about 8 minutes such as from about 10 minutes or from about 12 minutes or from about 15 minutes, to about 45 minutes, or to about 35 minutes or to about 30 minutes or to about 25 minutes or to about 20 minutes or to about 15 minutes, such as for about 10 minutes or for about 15 minutes or for about 20 minutes or for about 50 minutes or for about 60 minutes.

The apparatus further comprises one or more containers to receive and store the slaughtered fish in an "under-cooled" state at a temperature below 0° C. until it is processed. The cooling device for performing steps i) and ii) of bringing the fish to an "under-cooled" state comprises means for providing substantially continuous movement of the content during the process of bringing the slaughtered fish to an "under-cooled" state.

The present invention further provides a fishing vessel for catching and slaughtering fish, said fishing vessel further comprising the apparatus of the present invention.

BRIEF DESCRIPTION OF THE DRAWINGS

FIG. 3A shows a salmon fillet after pin bone removal, in which the fillet looks fine and undamaged. FIG. 3B shows two bones, on top a bone removed from a salmon after traditional chilling and below a bone removed from a salmon after sub-chilling, in which no flesh is attached to the bone from the salmon chilled with sub-chilling, but flesh is attached to the salmon bone chilled with traditional chilling. FIG. 3C shows a comparison of two fillets after pin bone removal.

DETAILED DESCRIPTION OF THE PREFERRED EMBODIMENTS

Figure 1:
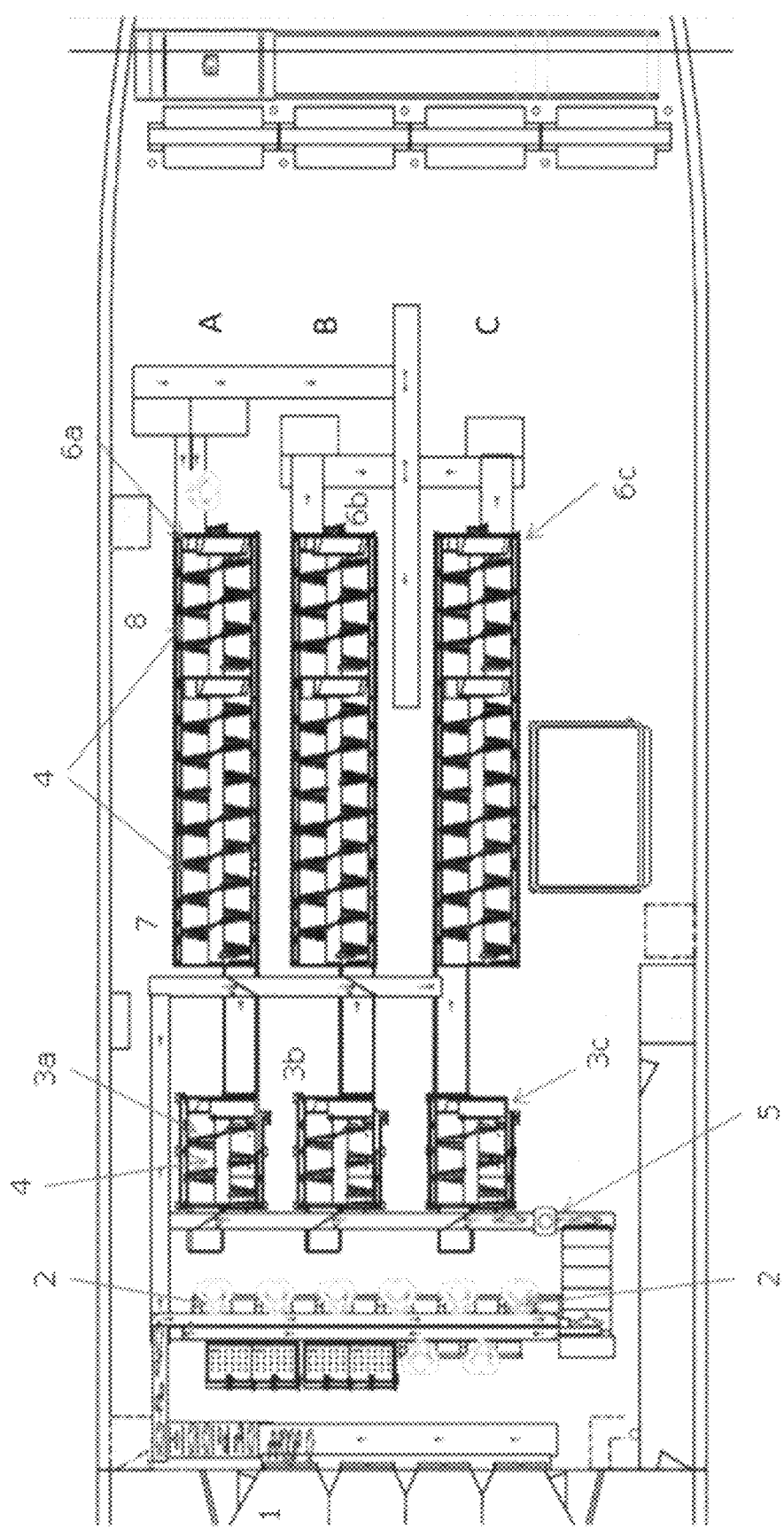
FIG. 1 shows an arrangement of the vessel of the invention to facilitate pre-processing and sub-chilling of whole fish on a fishing ship.

The following definitions and embodiments relate to the method, the apparatus and the fishing vessel of the invention.

In the present context the term "under-cooling" or "sub-chilling" refers to the process or method of bringing fish to a desired temperature at or near the phase transition of freezing the fish without freezing the fish, and generally below the freezing point of water (0° C.). Furthermore, these terms refer to a fish or fish product being brought to or kept at a desired temperature at or near the phase transition of freezing the fish without freezing the fish, such as a temperature below 0° C. (sub-zero conditions), such as preferably at or below −0.2° C., or more preferably at or below −0.5° C., or at or below −0.7° C., or at or below −0.8° C., such as at or below −1.0° C., such as at or below −1.5° C.

In the present context the term "fish" or "whole fish" relates to a fish which is either freshly caught and unprocessed at all or cut and/or bled and/or gutted and/or washed and/or graded and/or de-headed and/or the tail has been removed or any combination thereof.

In the present context the terms "rigor", "rigor phase" and "rigor mortis" refer to stiffening of muscles after death or slaughtering of fish. The terms are equally used for what is accomplished by the present invention, which is delaying the fish for entering rigor mortis and also keeping the fish in the rigor phase for a longer time per time unit. The term "delaying rigor mortis" in slaughtered fish" refers to both delaying the fish for entering rigor mortis and prolonging the time the fish takes to pass through the rigor phase.

In the present context the terms "substantially continuous movement" refers to movement of the fish in the solution. The substantially continuous movement is provided by stirring means, such as a rotating blade in a container or any other stirring or agitating device in the container, or by circulation pumping of solution in and out of the container through via a heat exchanger, or by movement of the container it-self. "Substantially continuous movement" also comprises stepwise movement, e.g. a rotating blade that rotates stepwise every 1, 2 or 5 seconds, or the like, such that the mass of fish and fluid being moved is not at a standstill for any extended period of time (not more than a few seconds) and preferably continuously moving.

In an embodiment of the present invention the fish is pre-cooled before or after bleeding, before starting the process of bringing the fish to an under-cooled state.

In an embodiment of the present invention the salt concentration and set temperatures of the salt-controlled and temperature controlled solution(s) for each step in the pre-cooling and under-cooling are based on the species, size and fat content of the fish being brought to an under-cooled state.

In an embodiment of the present invention the time for each step in the pre-cooling and under-cooling is based on the species, size, as well as the fat content of the fish and the quantity of the fish being cooled. In one embodiment, freshly caught cod, slaughtered, gutted and bled is first cooled for 40-50 minutes at a set temperature of −1° C. in a solution of 3% salt concentration and then transferred to a solution of 7% salt concentration set at a temperature of −3° C. preferably for about 15 minutes. Salmon has more fat content, so slaughtered, gutted and bled salmon of same size is in one embodiment cooled for 60 minutes at a set temperature of −1° C. in a solution of 3% salt concentration and then transferred to a solution of 8% salt concentration set at a temperature of −4.5° C. for 25 minutes.

In an embodiment of the present invention a continuous movement of the fish in the solution is provided during the step of bringing the fish to an under-cooled state to prevent the fish surface of the fish from freezing and to prevent the formation of shell or crust at the surface of the fish during the cooling process. The continuous movement of the fish in the solution speeds up the cooling process and allows the use of a cooling solution at a warmer temperature, such as close to the target temperature at a certain cooling step.

In an embodiment of the present invention the fish is maintained at a temperature above freezing point of the fish, but at or near the phase transition temperature of freezing the fish without freezing the fish, such as at a temperature in the range from between about −0.5 to about −2° C. during storing, transfer and processing, such as at about −0.5° C., about −1° C., or about −1.5° C.

In an embodiment of the present invention the fish is skinned in rigor after being brought to an undercooled state and transported and/or stored according to the method of the invention.

In an embodiment of the present invention the fish undergoes pin-bone removal in rigor after being brought to an undercooled state and transported and/or stored according to the method of the invention.

In an embodiment of the present invention the apparatus is positioned at a fish farm where fish is brought out of aquaculture and slaughtered on site cooled and stored.

In an embodiment of the present invention the apparatus further comprises means for skinning the fish in rigor after the fish has been brought to an undercooled state and transported and/or stored according to the method of the invention.

In an embodiment of the present invention the fish is bled prior to the under-cooling step. The bleeding step can be allowed to occur in a container with liquid. Furthermore, the fish can be subjected to pre-cooling before or after bleeding. In a further embodiment of the present invention the steps of bleeding and undercooling take place in cooling chambers with screw conveyors. The cooling tanks of disclosed herein have one or more compartments being at least partially filled with cooling liquid and a spiral shaped blade or screw conveyor extending between the in-feed and the out-feed ends of the tank. The blade rotates and provides a rotational movement of the screw conveyor thereby conveying the food products between the in-feed and the out-feed ends of the tank. In-feed of cooling liquids of different salt concentration and temperature regulates the temperature in the tanks or in the different compartments of the tank in order to alter the temperature of the whole fish during the process of bleeding, pre-cooling and bringing the whole fish to an under-cooled state.

In an embodiment of the present invention the cooling device is an elongated cylindrical or semi-cylindrical tank and comprises a spiral shaped blade mounted on a rotation axis to convey the objects along the length of the tank. Furthermore, the rotation of the spiral shaped blade provides the movement of the fish in the container.

In an embodiment of the present invention the fish is brought to a homogenous temperature in the range between −0.2 and −4.0° C., such as a temperature in the range from about −0.5° C., such as from about −0.8° C., such as from about −1.0° C. or from about −1.2° C., to about −4.0° C., or to about −3.5° C., such to about −3.0° C., or to about −2.5° C. In the present context the term "homogenous temperature" refers to equalised average temperature which is measured from 0 to 120 minutes after a cooling process.

In an embodiment of the present invention the fish is stored at a temperature below 0° C. between catching and processing. For best quality of end product, the fish is bled, gutted and washed before it is processed.

In an embodiment of the present invention the fish is placed in a saline solution before processing, including de-heading, filleting and/or skinning the fish. In the present context the term "saline solution" relates to a salt-controlled liquid, sea water or brine having the concentration in the range between 0.01-16%. The saline solution is cooled below −0.01° C. by a refrigerating system.

In an embodiment of the present invention the temperature of the fish is in a range between −0.5 and −2.5° C. when the fish is filleted or subjected to pin-bone removal, such as at a temperature of −1.5° C. or −1° C.

In an embodiment of the present invention the cooling tank has more than one compartments to bring the fish to an under-cooled state in at least two steps, such as for performing steps i) and ii) above separately. Furthermore, a tank with a plurality of compartments may be used to bleed, pre-cool and rinse the fish prior to the step of bringing the fish to an under-cooled state.

In an embodiment of the present invention a pre-processing workstation is provided before the cooling tank to bleed and/or gut the whole fish prior to under-cooling the whole fish.

In an embodiment of the present invention a separate tank or a separate first container in the cooling tank is provided to facilitate the bleeding of the fish.

In an embodiment of the present invention the separate tanks or the compartments in the cooling tank comprise screw conveyors to transfer the whole fish from one end of a compartment to another and to transfer the fish from one compartment to another.

In an embodiment of the present invention workstations are provided after the cooling tank for one or more of filleting, skinning removing pin-bones and portioning the whole fish.

In an embodiment of the present invention the imaging means is provided for determining size, shape or colour of the whole fish prior to transferring the fish to the cooling tank.

In an embodiment of the present invention the whole fish is being transferred from the sea, lake or a sea cage, aquaculture cage, marine cage or the like bringing the fish to an undercooled state directly after slaughtering.

FIG. 1 shows an arrangement of the vessel of the invention to facilitate pre-processing and sub-chilling of whole fish on a fishing ship. The fish is brought on deck in the aft end of the ship 1 and brought to workstations 2 to gut and bleed the fish. The fish is then transported to a short cooling tank 3a, 3b, 3c with a screw blade 4 for the bleeding step. The embodiment shown in this drawing has three lines of a bleeding and undercooling tanks, the first one A for small fish, the second B for intermediate size fish and the third line C for large fish. Size determination is made by a camera 5 and the fish are directed into an appropriate lane based on this size determination. The fish is transported through the tank by the screw blade 4, which functions as a screw conveyor and slowly moves the fish from one end of the tank to another. For the bleeding step, see water may be selected saline solution. The fish is then transported to a larger tank 6a, 6b, 6c, for a first step of bringing the whole fish to an under-cooled state. In the embodiment shown in FIG. 1, the tank is divided into two compartments 7 and 8 for performing a two-step cooling of the fish. For demonstration we will follow line A (for small fish). The difference between line A, B and C is that duration of transfer in each compartment is based on the size of the fish, but the duration of transfer is regulated by the speed of the screw blade. Each compartment in the cooling tank 6 has a separate screw blade 4 and a heat exchanger (not shown) to set the temperature in each compartment. The first compartment 7 is long and has a concentration and temperature controlled saline solution with a low salt concentration at a higher temperature to allow the fish to achieve a stable homogenous/even temperature, preferably about −0.5° C. The second compartment 8 is shorter and has a concentration controlled saline solution with a higher salt concentration to bring the temperature of the fish down to about −1 to −1.5° C. based on the size and fat content of the fish.

Figure 2:
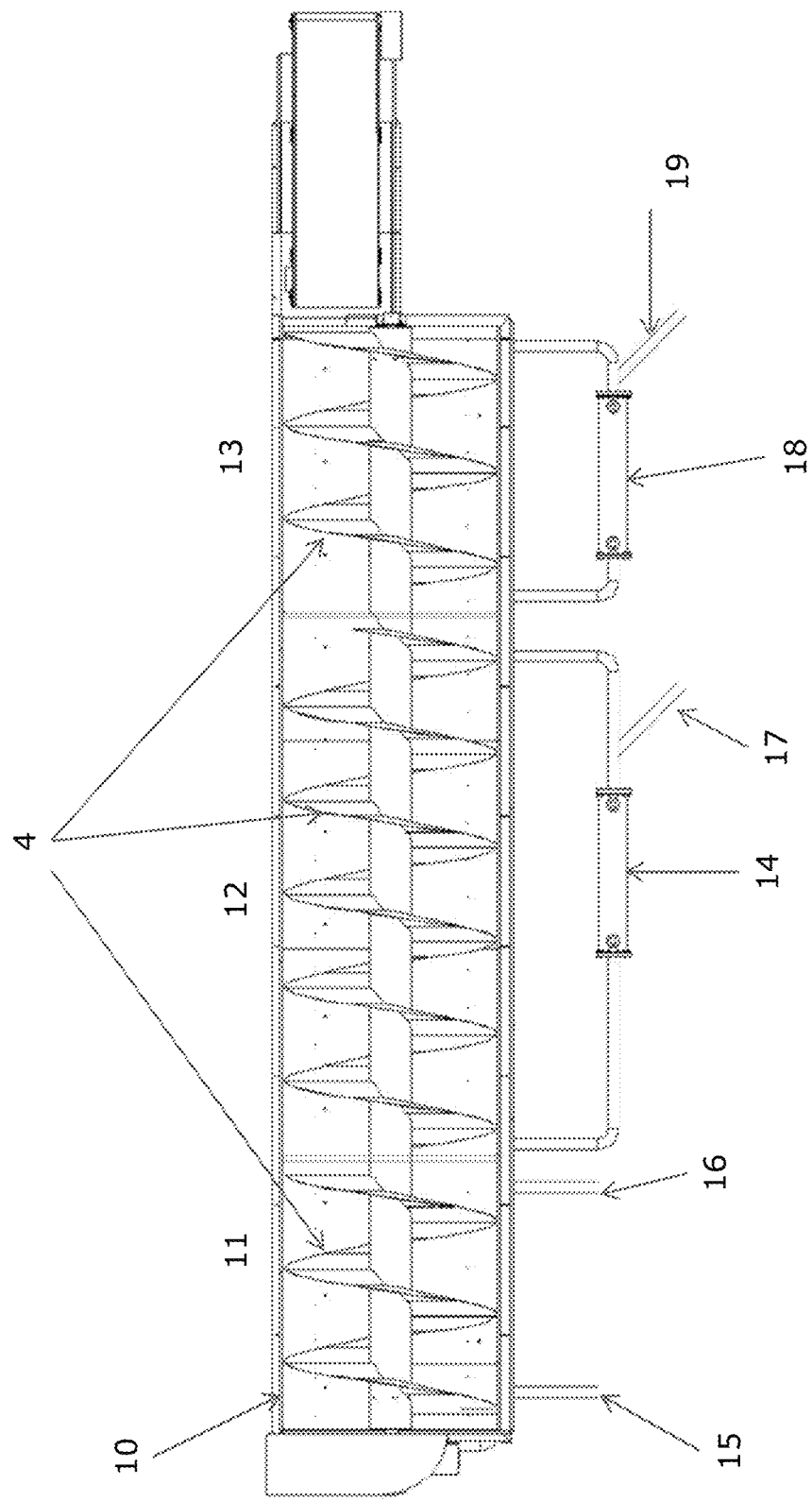
FIG. 2 shows an arrangement of device of the invention to facilitate pre-processing and under-cooling of whole fish.

FIG. 2 shows an arrangement of device of the invention to facilitate pre-processing and under-cooling of whole fish. It is a simple embodiment of a tank 10 with three compartments 11, 12 and 13. Each compartment in the cooling tank 10 has a separate screw blade 4 and two compartments have a heat exchanger 14 to set the temperature in each compartment. Temperature can be regulated by a combination of saline solution and heat. The middle compartment 12 is three times longer than the first 11 and the third 13 compartments. The number of compartments is not limited but this embodiment shows a tank where sea water could be pumped into the tank via inlet 15 and out through outlet 16. If the first compartment 11 is a bleeding compartment, it is important to have a good flow of liquid through the compartment. The second compartment is connected to a heat exchanger 14, but sea water or salt controlled solution can be pumped in as needed through inlet 17. This compartment brings the fish from the temperature of the sea (about 4-8° C.) to between +1 and −2° C. The third compartment is used to initiate the phase exchange and bring the fish towards −1 to −3° C. The third compartment 13 also comprises a second heat exchanger 18. Sea water or salt controlled solution can also be pumped into the third compartment as needed through inlet 19. The blade in each compartment is designed such that at the end of the compartment the blade has a curve (not shown in detail) so it pushes the fish over the edge and into the next compartment.

Example 1. Analysis of the Difference Between Sub-Chilling and Traditional Chilling of Salmon Salmon was taken just after slaughtering and chilled either by using ice (traditional) or by the sub-chilling method of the present invention. The sub-chilled salmon was chilled in a screw-container for 1 hr in a two-step process, where it was first brought into a solution with a temperature of −1° C. and then further to −4° C. Thereafter the salmon was stored at −1.5° for 4 days. The salmon receiving traditional treatment was chilled on ice for 4 days in EPS boxes. Further processing of salmon 4 days after slaughtering showed that the fish was easy to process and had a good resistance to heading and filleting processes resulting in higher yield (Fig not shown).

Table 1 shows the temperature of the fillets after 2, 4 and 6 days as well as softness and gaping.

TABLE 1

| | Days | | | | | |
| --- | --- | --- | --- | --- | --- | --- |
| | 2 | | 4 | | 6 | |
| | Sub Chilled | Traditional | Sub Chilled | Traditional | Sub Chilled | Traditional |
| Temp ° C. | −1.5 | 0 | −1.5 | 1 | −1.5 | 0.2 |
| Softness | 0 | 1 | 0 | 1 | 0 | 2 |
| Gaping | 0 | 2 | 0 | 3 | 0 | 4 |
| Rigor | yes | No | Yes | No | No | No |

The results show that the sub-chilled salmon maintains a homogenous temperature of −1.5° C., whereas the traditionally chilled salmon reaches higher temperature, becomes softer and shows increased gaping. The traditionally chilled salmon also starts to get softer, whereas the sub-chilled salmon maintains stiffness.

Figure 3A:
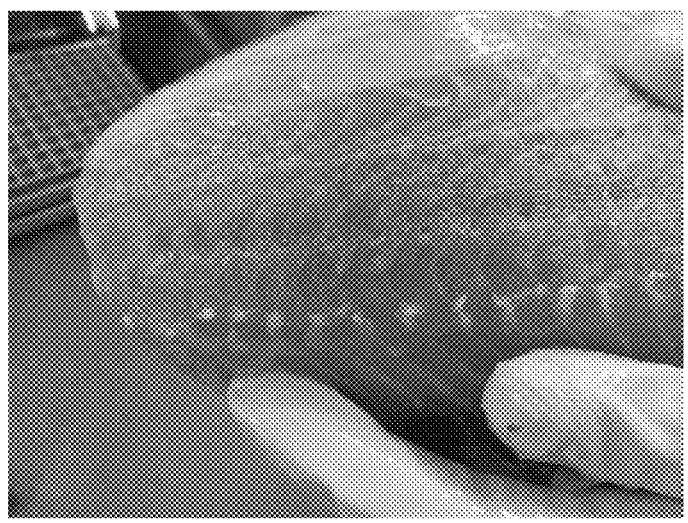
FIGS. 3A-3C show pin bone removal while salmon is in rigor and how pin bones car be removed without damaging fillet.
Figure 3B:
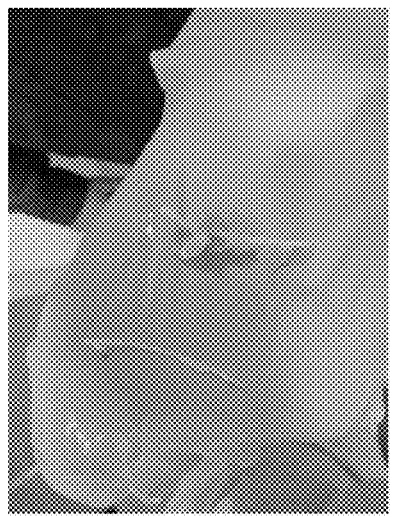
Figure 3C:
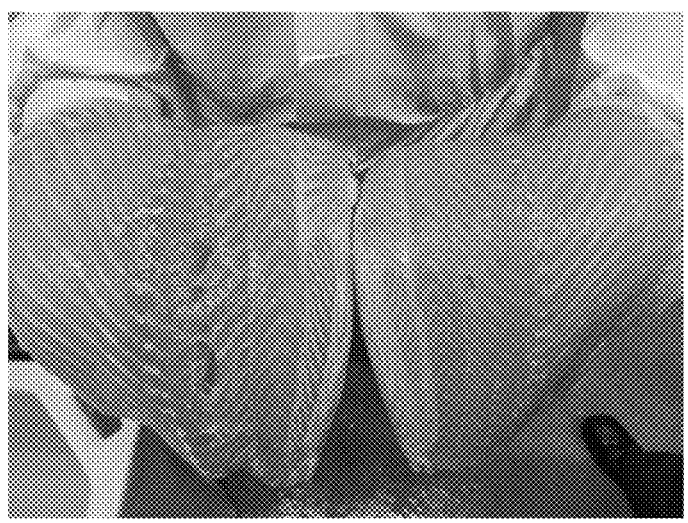

FIG. 3 shows pin bone removal while salmon is in rigor and how pin bones car be removed without damaging fillet. FIG. 3A shows a salmon fillet after pin bone removal. The fillet looks fine and undamaged. FIG. 3B shows two bones, on top a bone removed from a salmon after traditional chilling and below a bone removed from a salmon after sub-chilling. No flesh is attached to the bone from the salmon chilled with sub-chilling, but flesh is attached to the salmon bone chilled with traditional chilling. FIG. 3C shows a comparison of two fillets after pin bone removal. On the left is a fillet, which was chilled by traditional chilling and on the right is a fillet chilled by sub-chilling. The fillet chilled by traditional chilling is damaged after the bin bone removal, whereas the fillet chilled by sub-chilling has very little damage.

Product shelf life of the salmon was also examined based on the chilling method. Table 2 shows bacterial count comparison between salmons chilled by traditional vs. the sub-chilling method.

TABLE 2

| Days | Total count | | Black colonies/g | |
|---|---|---|---|---|
| | Sub-Chilled | Traditional | Sub-Chilled | Traditional |
| 2 | <10.000 | 20.000 | <10.000 | <10.000 |
| 6 | <10.000 | <10.000 | <10.000 | <10.000 |
| 10 | 20.000 | <10.000 | <10.000 | <10.000 |
| 16 | 20.000 | 300.000 | <10.000 | 30.000 |
| 21 | 2.100.000 | 39.000.000 | 20.000 | 910.000 |

The results show that the sub-chilling method extends shelf life dramatically.

Table 3 shows final product quality comparison between salmons chilled by traditional vs. the sub-chilling method. The slower rigor process obtained by the method of the present invention results in less drip and the fish tastes better as it retains its natural juice and flavours.

TABLE 3

| | Cooking Yield comparison | |
|---|---|---|
| Days | Sub-Chilled | Traditional |
| 2 | 95.9% | 95.0% |
| 6 | 95.3% | 95.6% |
| 10 | 93.7% | 94.2% |
| 16 | 95.3% | 87.0% |
| 21 | 93.9% | 84.8% |

Figure 4:
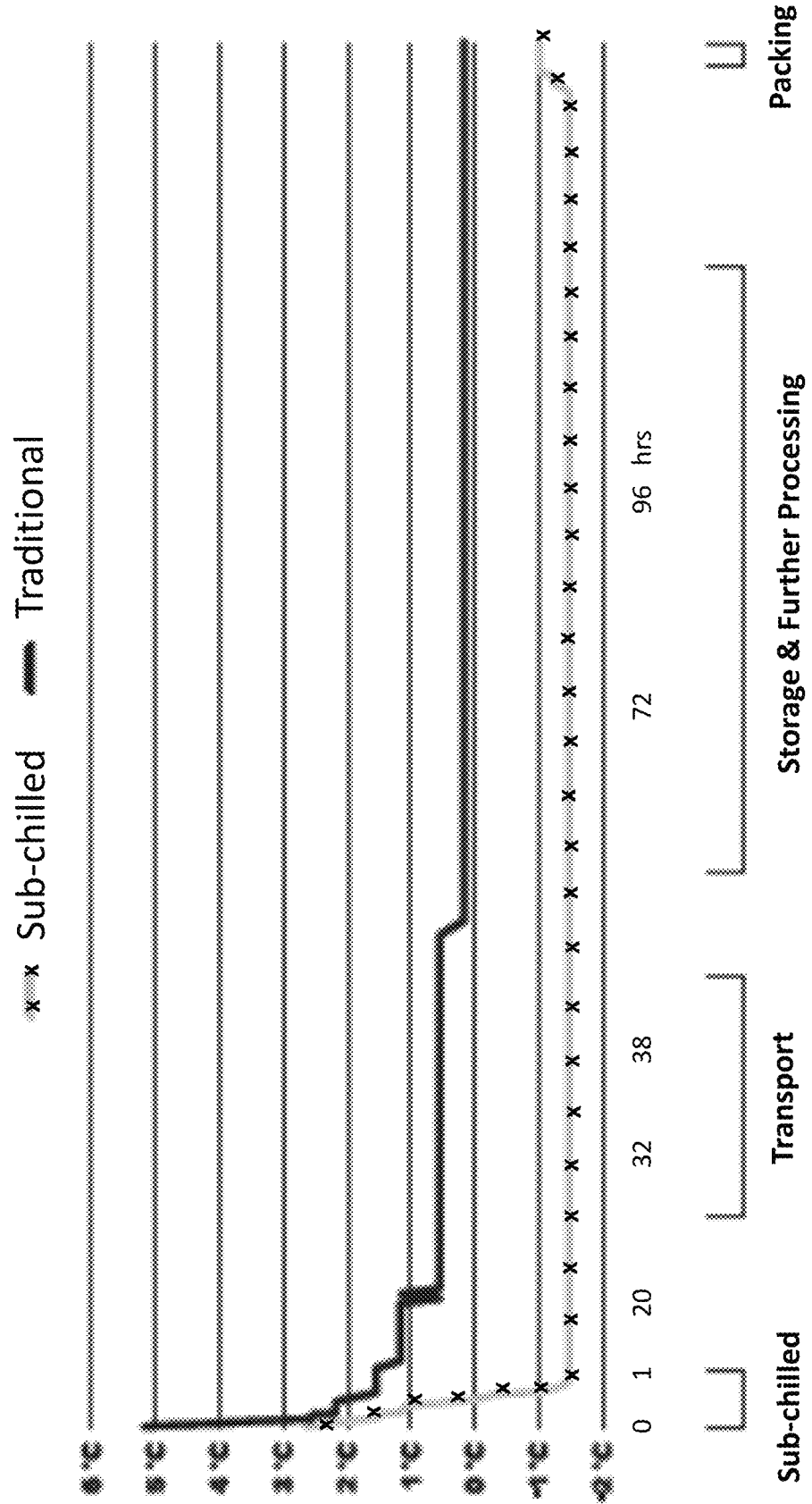
FIG. 4 shows temperature monitoring during transport and processing of salmon chilled by traditional method and sub-chilling method.

FIG. 4 shows temperature monitoring during transport and processing of salmon chilled by traditional method and sub-chilling method. Sub chilled salmon maintains a temperature of −1.5° C. The temperature of the fish remains stable and the salmon is in rigor throughout the whole the process. The traditionally chilled salmon never enters sub-zero conditions and takes longer to cool down.

The invention claimed is:

1. A method for delaying rigor mortis in slaughtered fish, the method comprising:
   a) receiving slaughtered fish;
   b) bringing the slaughtered fish to an under-cooled state in at least one container comprising
      placing the slaughtered fish in a first solution having a salt concentration in the range from 0.1 to 10% and a temperature in the range from +1 to −3° C. wherein the salt concentration and the temperature of the first solution is based on the fish species; and
      transferring the slaughtered fish to a second solution having a salt concentration in the range from 1% to 20% and a temperature in the range from −1 to −12° C.;
   wherein:
   i) the salt concentration of the first and second solution is set and a temperature of the first and second solution is maintained such that the temperature is higher than the freezing point of the first and second solution,
   ii) providing substantially continuous movement of the slaughtered fish in the first and the second solution,
   iii) maintaining the ratio of the first and the second solution and slaughtered fish such that the volume of the first solution is greater than 50% of the total volume of the fish and the first solution and the volume of the second solution is greater than 50% of the total volume of the fish and the second solution,
   c) transferring the slaughtered fish to a transport or storage container, where the temperature in the transport container, the storage container, or both is maintained below 0° C.; and
   d) increasing the transportation or storage time and/or the shelf-life of the slaughtered fish by delaying rigor mortis in the slaughtered fish.

2. The method according to claim 1, wherein in step (b)(i) the temperature of the first solution and the second solution is at least about 0.5° C. higher than the freezing point of the respective first solution and the second solution.

3. The method according to claim 1, wherein in step (b)(i) the temperature of the first solution and the second solution is at least about 1.0° C. higher than the freezing point of the respective first solution and the second solution.

4. The method according to claim 1, wherein the fish is pre-cooled to a temperature of below about 6° C., gutted and/or bled before step b).

5. The method according to claim 1, wherein the salt concentration and the temperature of the second solution is based on the fish species.

6. The method according to claim 1, wherein the time period of bringing the fish to an under-cooled state is based at least in part on the size and the quantity of the fish being cooled.

7. The method according to claim 1, wherein the at least one container is an elongated cylindrical or semi-cylindrical tank and comprises a spiral shaped blade mounted on a rotation axis to convey the objects along the length of the tank.

8. The method according to claim 7, wherein the rotation of the spiral shaped blade provides the movement of the fish in the at least one container.

9. The method according to claim 1, wherein the volume of the first solution and the second solution in step (b) (iii) is between 55% and 75% of the total volume of fish and the respective first solution and second solution.

10. The method according to claim 1, wherein the fish is maintained at between −0.5 and −2° C. during step c).

11. The method according to claim 10, wherein the fish is maintained at −1° C. in step c).

12. The method according to claim 1, wherein in step (b)(i) the temperature of the first solution and the second solution is at least about 1.5° C. higher than the freezing point of the respective first and the second solution.

13. The method according to claim 1, wherein the fish is pre-cooled to a temperature of below about 4° C., gutted and/or bled before step b).

14. The method of according to claim 1, wherein the salt concentration and the temperature of the first solution, the second solution or both is based on the fat content of the fish.

* * * * *